Nov. 17, 1953  R. W. GREEN  2,659,455
HINGED AXLE SUPPORT FOR AUTOMOTIVE VEHICLE LIFTS
Filed Dec. 30, 1950  3 Sheets-Sheet 1
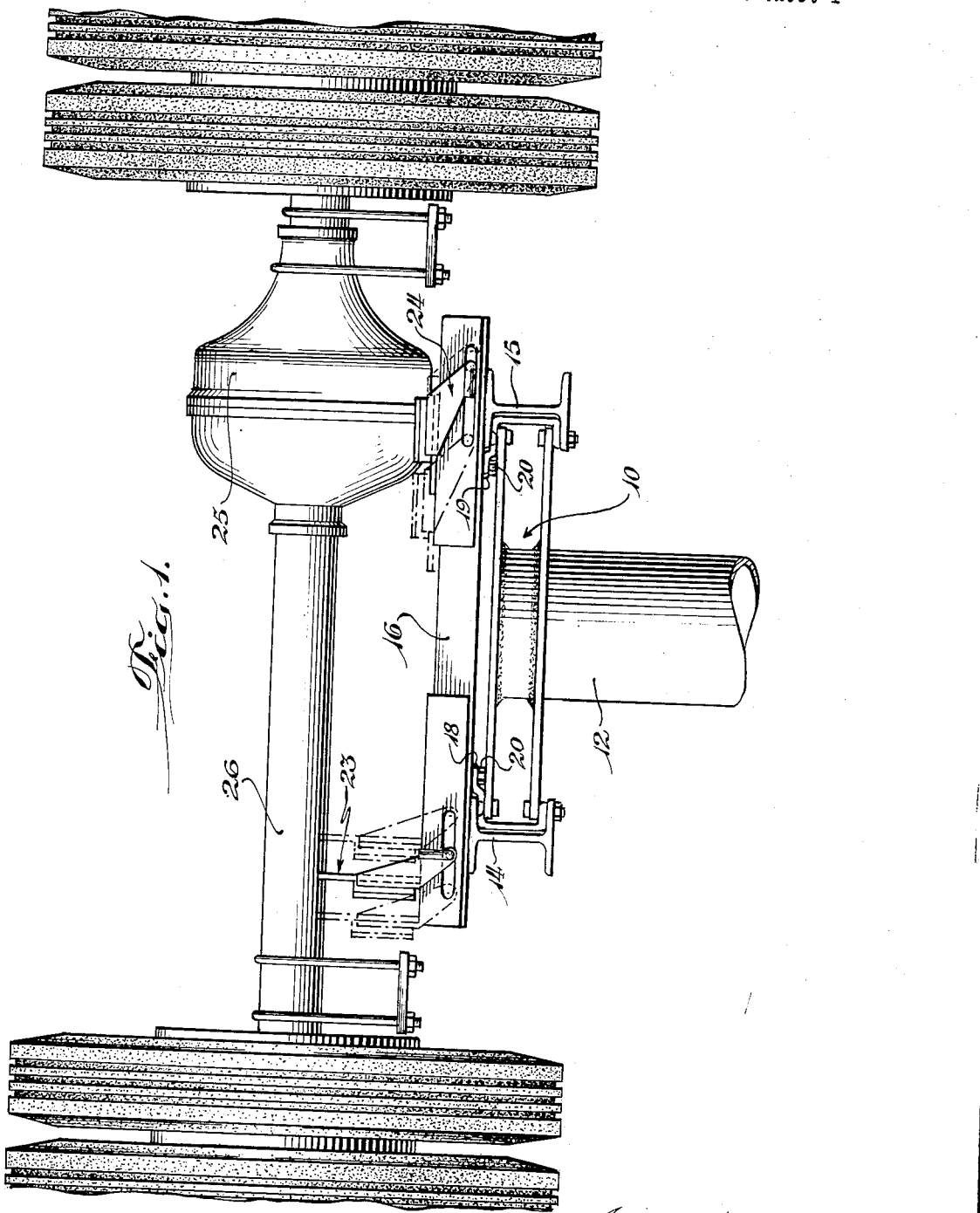
Inventor:
Richard W. Green
By Hinkle, Horton, Ahlberg & Wupper,
Attorneys.

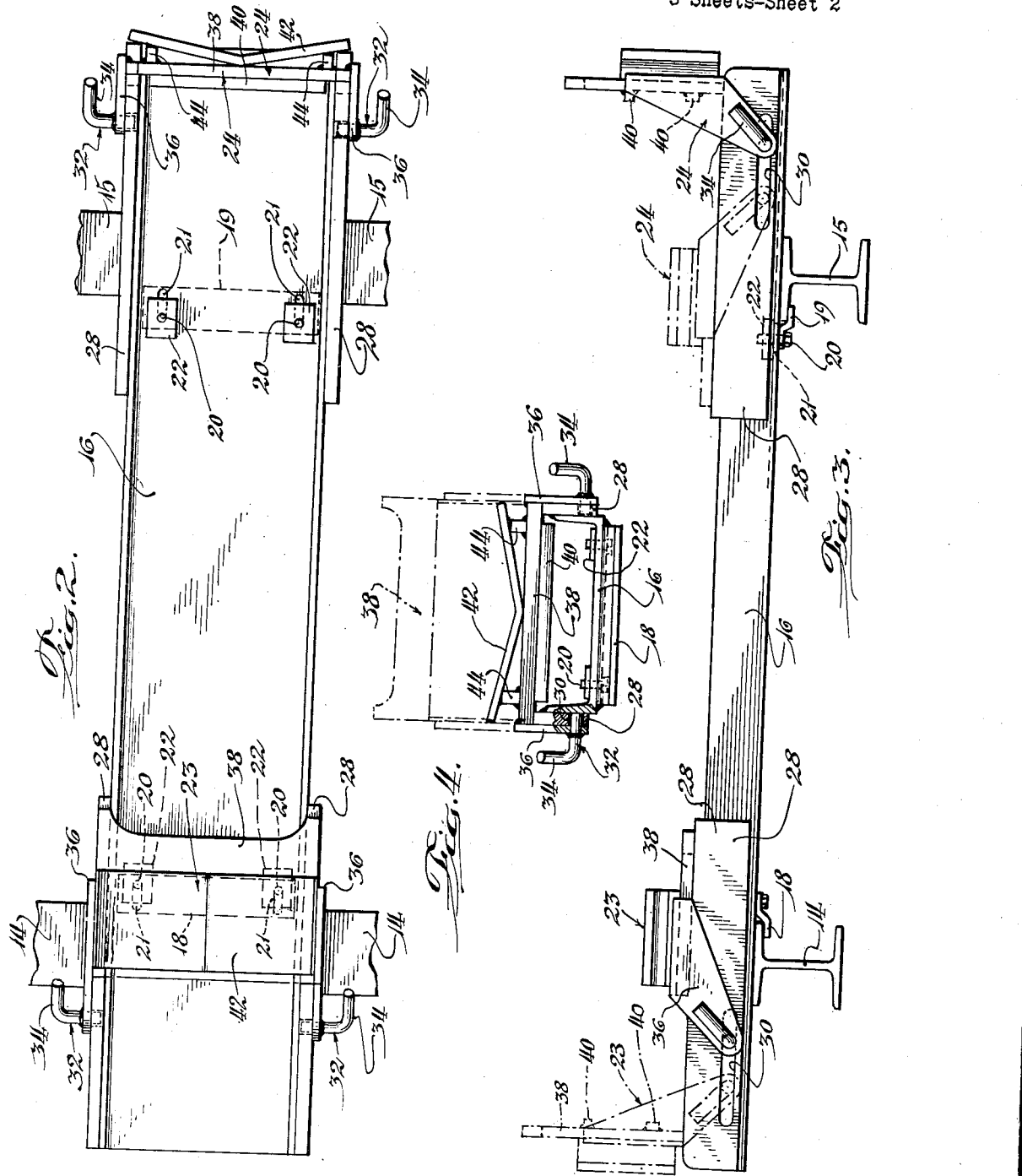

Nov. 17, 1953   R. W. GREEN   2,659,455
HINGED AXLE SUPPORT FOR AUTOMOTIVE VEHICLE LIFTS
Filed Dec. 30, 1950   3 Sheets-Sheet 3
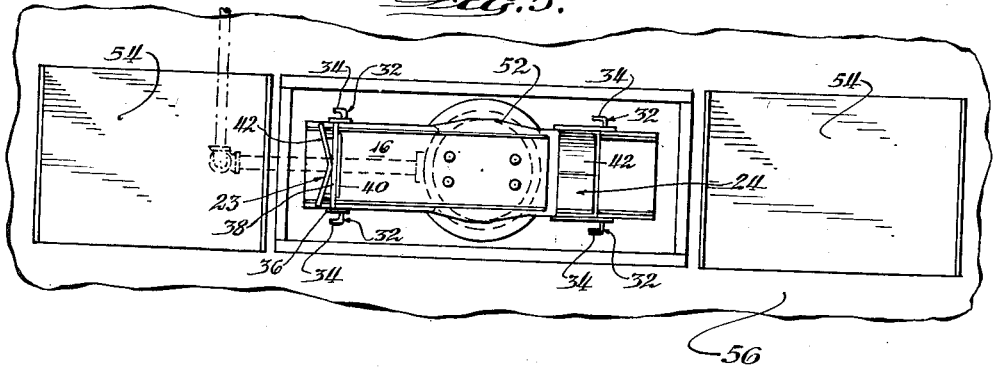
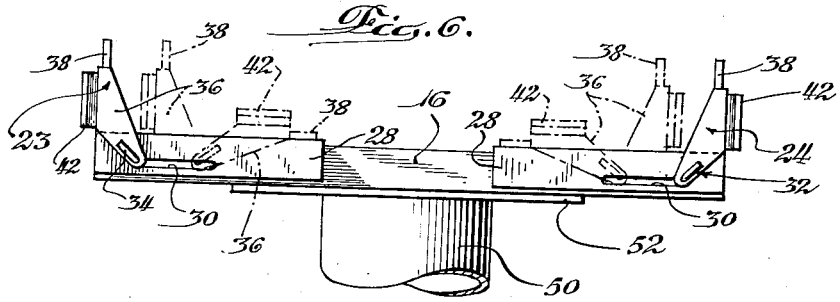
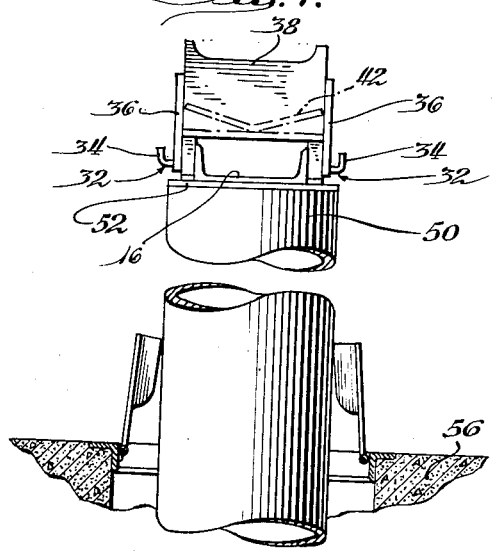
Inventor:
Richard W. Green
By Hinkle, Horton, Ahlberg & Wuppa
Attorneys Patented Nov. 17, 1953

2,659,455

UNITED STATES PATENT OFFICE 2,659,455

HINGED AXLE SUPPORT FOR AUTOMOTIVE VEHICLE LIFTS

Richard W. Green, Memphis, Tenn., assignor to Rotary Lift Company, Memphis, Tenn., a corporation of Delaware Application December 30, 1950, Serial No. 203,679

4 Claims. (Cl. 187—8.75)

My invention relates generally to hinged axle supports for automotive vehicle lifts, and more particularly to supports of this character which are adjustable in position and height so as to be adapted for engagement with various types of axles of automotive vehicles.

In lifts of the free wheel type in which the vehicle is elevated by the engagement of the lift supporting structure with the axles of the vehicle, considerable difficulty has been encountered in adapting the lift structure for engagement with the rear axles of trucks, buses, and the like in which the axle housing includes a differential or speed change gear housing which is not located centrally of the axle. In endeavoring to elevate such vehicle with a lift having a conventional load supporting structure, it has in the past been necessary to provide wooden blocking between the lift structure and the axle in order that the axle would be level when the lift is raised. Such blocking was unstable and presented the hazard of the vehicle falling from the lift. The use of such blocking was time consuming and difficult.

In accordance with the present invention these difficulties are obviated and I have provided a simple, easily adjustable axle support which may be used for engaging rear axles having either central or off center gear housings.

It is thus the primary object of my invention to provide an improved adjustable axle supporting means which is usable for engagement with a wide variety of different types of rear axle housings.

Other objects will appear from the following description, reference being had to the accompanying drawings, in which:

Fig. 1 is an elevational view of the load supporting structure of a hydraulic vehicle lift showing the improved rear axle support attached thereto, and illustrating the manner in which it is used;

Fig. 2 is a plan view of the improved axle support;

Fig. 3 is a side elevational view thereof;

Fig. 4 is an end elevational view thereof;

Fig. 5 is a plan view showing the improved axle support secured directly to the lift plunger;

Fig. 6 is a side elevational view; and

Fig. 7 is an end elevational view of the structure shown in Fig. 5.

Referring to Fig. 1 there is illustrated a load supporting structure 10 of the lift secured to the upper end of a plunger or ram 12, the load supporting structure including a pair of I-beams 14 and 15, these beams or rails being spaced substantially closer together than the tread width of highway vehicles. Resting upon the rails 14, 15 is a channel shaped bridge 16 held against longitudinal movement (transversely of the lift beams) by a pair of clips 18, 19 which are secured to the bridge channel 16 by pairs of bolts 20 extending through elongated slots 21 in the web of the channel 16 and threaded into nuts 22.

Adjustably positioned upon the bridge 16 are a pair of similar axle engaging supports, designated generally by the reference characters 23 and 24. These axle supports may be identical, it being noted that the right hand support 24 in Fig. 1 is in lowered position for engagement with the gear housing 25, while the left hand axle support 23 is in elevated position for engagement with the axle housing 26 of a highway vehicle. The axle engaging supports and the manner in which they are secured to the bridge are more clearly shown in Figs. 2, 3 and 4.

At each end of the bridge channel 16 there are welded a pair of load bearing and reinforcing plates 28. Each of these plates 28 is provided with an elongated slot 30 for the reception of the end of a pintle rod 32 which is bent at a 90° angle to provide a handle portion 34. Each of the pintle rods 32 is welded to a generally triangular shaped hinge plate 36 so as to be rigid therewith. An axle housing engaging plate 38 has its edges welded to the hinge plates 36, the upper edge of plate 38 being recessed (as best shown in Fig. 2) to receive the axle housing and prevent the latter from shifting relative to the plate.

When the support 24 is in its raised position, as shown to the right in Fig. 3, the lower edge of the axle engaging plate 38 rests upon the upper edges of the bearing plates 28. A pair of reinforcing bars 40 are welded to each of the plates 38, these bars being of less length than the plates 38 so as to be receivable between the flanges of the bridge channel 16 when the supports are lowered to the positions in which the support 23 is shown in dotted lines in Fig. 3 and as shown in full lines in Fig. 4. A V-shaped housing engaging plate 42 is rigidly secured to the plate 38 by a pair of spacers 44 which are welded to both plates 38 and 42.

In using the axle support structure shown in Figs. 1 to 4, the bridge channel 16 is first adjusted longitudinally of the rails or beams 14, 15 of the lift structure to accommodate the distance between the front and rear axles of the vehicle. Then if the vehicle has a rear axle housing of the type shown in Fig. 1, the right hand axle support will be swung to its lower position, indicated in Fig. 1, and the axle support 23 will be swung to its elevated position, as also illustrated in said figures. The supports 23, 24 may be adjusted longitudinally of the bridge channel 16 to any position intermediate the two positions indicated in dotted lines in Fig. 1 to accommodate any particular axle structures so as to clear various parts of the vehicles, such as brake hangers, spring clips, shock absorber brackets, etc., which are often attached to axles in the zone where lift blocks would normally engage the axle. The shifting of the axle supports 23, 24 may be done by hand preferably using a forked or socketed tool for engaging the handle portions 34 of the pintle rods 32. Having adjusted the axle engaging supports to the particular position required for the vehicle to be elevated, the lift may be raised and the supports 23, 24 will provide a solid, firm support for the rear axle.

The invention may also be applied to lifts of the two-post type in which the ends of the lift plungers are not connected by supporting rails. An embodiment of this form of the invention is shown in Figs. 5, 6 and 7 wherein the plunger or ram 50 of the lift is shown as having a head plate 52 secured thereto. Welded or otherwise suitably secured to the head plate 52 is a channel 16 similar to the bridge channel previously described. Axle supports 23 and 24 are mounted for adjustable positioning on this channel in the manner previously described. In order to position the vehicle properly relative to the lift, it is desirable to provide a pair of rear wheel spotting dishes 54 which may be embedded in the floor 56.

The use of the improved axle support disclosed herein greatly reduces the possibility of the vehicle shifting or falling from the lift and simplifies the operation of adjusting the lift for raising vehicles having rear axle and gear housings of different sizes and shapes.

While I have shown and described preferred embodiments of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In a load supporting structure for vehicle lifts, the combination of a channel arranged to be secured to the ram of a lift, a pair of load bearing plates secured along the sides at each end of the channel, each of said plates having elongated horizontal slots; and a pair of load engaging supports resting on said bearing plates, each of said supports comprising a pair of hinge plates having a pintle part rigid therewith and projecting freely into a slot in one of the bearing plates, and a pair of load engaging plates rigidly secured to each pair of hinge plates, one of said load engaging plates when said support is in at least one of its two operative positions having an edge offset from and spaced above said pintle so as to rest upon the bearing plates to provide at another edge an elevated load engaging surface, and the other load engaging plate being in a generally horizontal position and presenting a relatively low level load engaging surface when the support is in the other of its two operative positions.

2. An axle support for automotive vehicle lifts comprising, a channel for attachment to the elevating structure of a lift; and a supporting structure at each end of the channel comprising, a load bearing plate rigidly secured along each outer vertical side wall of the channel, each of said bearing plates having an elongated horizontal slot therein, a pair of hinge members, each having a pintle part rigidly secured to it and projecting freely into the elongated slot in the adjacent bearing plate, a flat plate bridging across the channel and having its ends secured respectively to the hinge members, said flat plate having its side edges extending beyond the side walls of the channel so as to rest upon the load bearing plates when the supporting structure is in its operative position, a plate conformed to engage and center an axle gear housing secured to said flat plate and having its load engaging surface a relatively short distance above the surface when the supporting structure is in one of two operative positions, the latter plates with said hinge members providing a rigid structure which may be moved longitudinally of the channel and may be swung about the axes of the pintle parts through an angle of substantially 90° from said position, thereby to cause the edge of the flat plate to rest on the upper edges of the load bearing plates, the upper edge of said flat plate in this position providing an elevated axle engaging surface.

3. In an axle support for automotive vehicle lifts having a pair of beams connected to the elevating mechanism of the lift, a channel extending transversely of the beams and arranged to be clamped thereto in longitudinally adjusted position relative to the beams, said channel member having at each end thereof structure for engagement with the axle housing of an automotive vehicle, the latter structure comprising, a pair of load bearing plates rigidly secured to the sides of each channel and extending a substantial distance along the end portion thereof, each of said plates having an elongated horizontal slot therein, a load engaging assembly having parts projecting into the slots and slidable longitudinally of the channel and also being capable of being pivoted from one operative position to another through an angle of substantially 90°, said load engaging structure including a plate member having a pair of faces pivotally movable in the vertical planes of the load bearing plates so that one face rests upon the bearing plates when the structure is in one operative position and the other face rests upon the bearing plates when the structure is in its other operative position, and said plate member in one position presenting a relatively elevated upper edge portion for engagement with the axle housing and when in its opposite position having said plate member in substantially horizontal position and providing means at a relatively low level for engagement with an enlarged diameter portion of the vehicle axle housing.

4. An axle support for automotive vehicle lifts comprising, a channel for attachment to the elevating structure of a lift; and a two-position supporting structure mounted for pivotal and longitudinal movement at each end of the channel comprising, a pair of hinge members, means secured to the side walls of the channel mounting said hinge members for pivotal and longitudinal movement, a flat plate bridging across and beyond the side walls of the channel and having its ends secured respectively to the hinge members, said flat plate having separate portions beyond the side walls of the channel engaging said means in each of the two positions of the supporting structure, a plate conformed to engage and center an axle gear housing secured to said flat plate and having its load engaging surface a relatively short distance above the channel when the supporting structure is in one of two operative positions, the latter plates with said hinge members providing a rigid structure which may be moved longitudinally of the channel and may be swung through an angle of substantially 90° from said position, thereby to cause the flat plate to be positioned in a vertical plane, said flat plate in this position providing an elevated axle engaging surface.

RICHARD W. GREEN.

References Cited in the file of this patent

UNITED STATES PATENTS

| Number | Name | Date |
| --- | --- | --- |
| 1,975,729 | Mulhollen | Oct. 2, 1934 |
| 1,990,242 | Mizer | Feb. 5, 1935 |
| 2,045,173 | Biard | June 23, 1936 |
| 2,158,399 | Carter | May 16, 1939 |
| 2,229,113 | Mizer | Jan. 21, 1941 |
| 2,592,845 | Aron | Apr. 15, 1952 |